June 23, 1925. 1,543,373
L. F. DOEN
COOKING UTENSIL
Filed Feb. 26, 1923
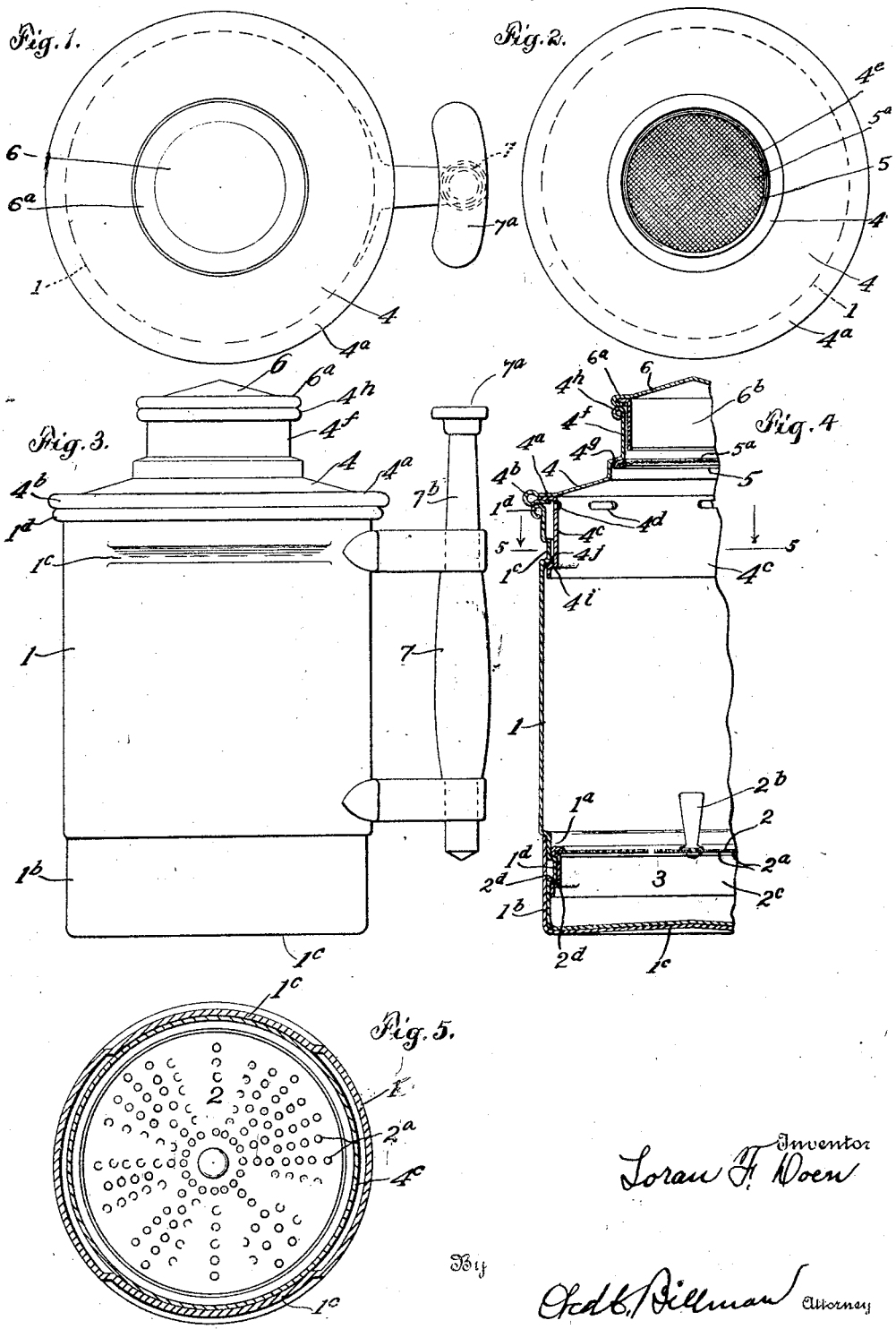

Patented June 23, 1925.

1,543,373

UNITED STATES PATENT OFFICE.

LORAN F. DOEN, OF CLEVELAND, OHIO.

COOKING UTENSIL.

Application filed February 26, 1923. Serial No. 621,213.

*To all whom it may concern:*

Be it known that I, LORAN F. DOEN, citizen of the United States, residing at Cleveland, in the county of Cuyahoga and State of Ohio, have invented certain new and useful Improvements in Cooking Utensils, of which the following is a specification.

My invention relates to improvements in cooking utensils, but more particularly to that class or type particularly designed and adapted for use in the cooking or preparation of cereals, vegetables, and other articles of food requiring a liquid in their preparation.

The primary object of the invention is to provide a generally improved cooking utensil of the class or type indicated which will be exceedingly simple in construction, cheap of manufacture and efficient in use.

A further and very important object is the provision of an improved food supporting diaphragm forming a removable false bottom within the receptacle and conjointly with the latter forming a liquid circulating chamber, said diaphragm or false bottom providing means for holding or suspending the articles of food during the cooking operation and whereby also such articles are afforded uniform cooking through the avoidance of scorching or overcooking in any portion thereof.

A still further and important object is the provision of a cooking utensil of this class having an improved construction and arrangement of top cover or closure member whereby the cooking vessel or receptacle may not only be securely closed during the cooking operation but the cooking liquid or by-products of cooking may be discharged or drained therefrom without disturbing or impairing the solid portions of the food being cooked, or if desired, warm water may be introduced into the interior as in cooking rice and similar materials to take off objectionable starch and by-products of cooking, as hereinafter more fully referred to.

A still further and important object is the provision of improved strainer top and handle members arranged in cooperative relation to each other and adapted when the discharge or strainer head is opened and the cooking vessel is up-ended or reversed for drainage purposes to support the cooking utensil in proper position during such drainage operation.

A still further object is the provision of improved means for removably securing the false bottom and closure top members in position for use.

There are other features of the invention residing in elemental combinations and particular construction of parts, all as will hereinafter more fully appear.

With the above mentioned and other ends in view, the invention consists in the novel construction, arrangement and combination of parts, hereinafter described, illustrated in one of its embodiments in the accompanying drawings and particularly pointed out in the appended claims.

Referring to the drawings, forming a part of this specification, Figure 1 is a top plan view of a cooking utensil, constructed in accordance with this invention, the removable top or closure members being closed.

Fig. 2, a similar view, the central or auxiliary top closure member being removed from the discharge opening and strainer member.

Fig. 3, a side elevation of the improved utensil, the top and closure members being in closed position for cooking.

Fig. 4, a fragmentary central vertical sectional view, the removable closure top and false bottom members being in locked or normal position and the vessel and connected parts being moved about circumferentially a quarter turn from the position shown in Fig. 3.

Fig. 5, a horizontal sectional view taken on line 5—5 of Fig. 4, the vessel and connected parts being restored to the position shown in Fig. 3.

Similar numerals of reference designate like parts throughout all the figures of the drawings.

The body of the cooking receptacle or vessel 1 may be of any suitable and convenient form. In the present instance, the vessel or receptacle 1 is of cylindrical form and is provided with an annular offset portion $1^a$, affording an annular recess to receive the rim portion $1^b$, of a jacket bottom $1^c$, of copper or other similar or suitable material.

As a means of forming a false bottom and providing a liquid circulating chamber beneath the particular food being cooked and also of suspending or supporting the articles of food during the cooking process, a food supporting diaphragm 2, is provided. The diaphragm 2 may be formed of any suitable and convenient foraminous material, as for example,—of sheet metal provided with a series of openings $2^a$. The diaphragm 2 forms a false bottom and is spaced above the main or true bottom of the receptacle to conjointly therewith form a liquid circulating chamber 3. The liquid circulating chamber 3 being located directly beneath the false bottom or diaphragm 2 and the superposed articles to be cooked, it will be seen that the latter will be held from direct contact with the bottom of the main cooking vessel or receptacle and the foraminous or open false bottom will permit a free circulation of the cooking liquid to and through the food being cooked.

The vessel or receptacle 1 is provided at its top with cover or closure members, the main cover 4 being provided with an overhanging flange $4^a$, terminating in an annular bead $4^b$, said flange $4^a$ being adapted to rest or be seated upon a bead $1^d$, formed about the upper marginal edges of the receptacle body. The main top or closure member 4 is provided with a depending rim $4^c$, adapted to extend within the upper marginal edges of the vessel or receptacle 1, said rim $4^c$, in the present instance, being formed separate from the cover 4 and being secured beneath the horizontal rim or flange $4^a$. As a means of causing any liquid which would otherwise be trapped or carried in the annular space between the rim $4^c$ and the adjacent marginal portion of the vessel 1 when the latter is reversed or up-ended for drainage purposes, the base portion of the rim $4^c$ is preferably provided with a plurality of drain slots $4^d$, as shown most clearly in Fig. 4 of the drawings.

The main lid or cover 4 is provided with a central discharge opening $4^e$ which, in the present instance, is formed by means of a central discharge spout $4^f$. As a means of straining the liquid contents and retaining the solid food material within the vessel, the spout $4^f$ is provided with an annular offset recess affording a shoulder $4^g$, upon which is mounted in a fixed or permanent position a strainer ring 5, provided with a strainer $5^a$, of wire of a suitable mesh.

As a means of covering or closing the discharge opening $4^e$ and the strainer $5^a$ during the active cooking operation, the spout $4^f$, in the present instance, is provided with a second or auxiliary closure member 6, provided with a rim $6^a$, the latter being connected to a depending rim $6^b$. The rim $6^b$ is adapted to fit within the spout $4^f$ and extend within the latter and it will be seen that the rim $6^a$ forms a flange adapted to rest or be seated upon the beading $4^h$ of the spout $4^f$ which forms the discharge opening $4^e$.

It will be seen that the inset portion $1^a$ of the receptacle 1 and the diameter of the false bottom or diaphragm 2 are such with respect to the inside diameter of the upper rim portion of the receptacle that such false bottom or diaphragm may be readily inserted through or removed from such upper portion of the vessel 1 through the medium of the central handle $2^b$ on the diaphragm or false bottom. It will be seen also that such diaphragm or false bottom is provided with a depending rim $2^c$ abutting against the side walls of the lower inset portion $1^a$ of the receptacle.

As a means of removably securing the false bottom 2 and the closure top or cover 4 in position a bayonet slot or joint is provided between the members 2 and 4 and such receptacle, said bayonet joint in the present instance, comprising diametrically opposite inwardly extending segmental rims $1^c$ and $1^d$ formed near the upper and lower edges of the main receptacle 1 and adapted to engage with correspondingly located flanges $4^i$, affording shoulders $4^j$, on the depending rim $4^c$ of the main cover or closure member 4 and to engage with shoulders $2^e$ formed by correspondingly located offset flanges $2^d$ of the rim portion $2^c$ of the false bottom or diaphragm 2, as shown most clearly in Fig. 4 of the drawings.

In the preparation of rice to produce a product corresponding to that produced in leading Chinese restaurants in the United States, the main cover with its closure member is removed and after the diaphragm or false bottom 2 has been secured in position the rice and water are introduced, sufficient water being introduced to insure that the rice will not become dry when cooked. In view of the form of the vessel and the provision for complete drainage, a surplus of water or cooking liquid may be introduced; the rice is then boiled until done approximately fifteen to twenty minutes; when properly cooked the cooking utensil is removed from the heating medium and the second or auxiliary closure member is then removed; warm water is then introduced into the receptacle through the opening $4^e$ and through the screen $5^a$ to circulate and wash the cooked material and particularly to take off the objectionable starch and by-products of cooking. This is continued until the rice is thoroughly washed; the utensil is then engaged by the handle 7 and all liquid is poured out of the spout or opening except enough to cover the cooked food; upon restoring the closure member 6 the vessel is again put back over the source of heat and the rice is again brought to a boiling point. The vessel or utensil is then removed from the stove or source of heat and the cooking liquid is drained off through the discharge opening $4^e$ and the screen $5^a$; the receptacle or vessel 1 is then reversed or up-ended with the open portion of the spout resting upon a base board or other suitable means of support, the cross arm 7ª of the handle 7 being arranged in a plane with the edges of the discharge spout so that the arm 7ª conjointly with the extension 7ᵇ of the handle form a supporting leg or pedestal conjointly with the spout supporting the vessel to completely drain the contents, the interior or lower portion of the receptacle being thus up-ended forming a steam trap or chamber to keep the food warm while being completely drained and waiting to be served. At the time of serving the utensil is returned to its original or upright position and the lock cover 4 removed for the complete discharge of the cooked material into a suitable serving dish or receptacle.

Should it be desired to steam food of any character water may be first introduced into the vessel or receptacle to a level of the false bottom 2 and the food to be steamed may then be introduced into the receptacle being supported upon the bottom or diaphragm 2.

Having thus described one of the embodiments of my invention, without having attempted to set forth all the forms in which it may be made, or all the modes of its use, what I claim and desire to secure by Letters Patent is,—

1. A cooking receptacle provided with a discharge opening and having a handle terminating in a plane with said discharge opening whereby said vessel may be supported by said handle in an inverted position for drainage.

2. In a cooking utensil, the combination with a cooking vessel having means for supporting it in an inverted position and provided with main and auxiliary covers, including a strainer; of a false bottom of open formation, said false bottom interlocking with said vessel forming a diaphragm and a subjacent liquid circulating chamber.

3. A cooking utensil, comprising a cooking vessel provided with a strainer top including a discharge spout, and a handle having an extension terminating in a plane with said discharge spout whereby the latter and said handle form supports for holding the vessel in an upright reversed position for drainage.

4. In a cooking utensil, a cooking vessel provided with a top having a central discharge spout and at its side with a handle having an extension terminating in a cross bar arranged in a plane with the mouth of said spout whereby when said utensil is reversed said spout and extension handle and cross bar form supports for the utensil.

In testimony whereof I have affixed my signature.

LORAN F. DOEN.